United States Patent [19]

Nakamura

[11] Patent Number: 5,257,794
[45] Date of Patent: Nov. 2, 1993

[54] CORNER JOINT, CHASSIS AND CART

[75] Inventor: Keiichi Nakamura, Shizuoka, Japan

[73] Assignee: Yazaki Industrial Chemical Co., Ltd., Shizuoka, Japan

[21] Appl. No.: 866,745

[22] Filed: Apr. 10, 1992

[51] Int. Cl.⁵ .............................................. B62B 3/02
[52] U.S. Cl. ............................... 280/79.3; 280/47.34; 24/270; 211/182; 248/68.1; 248/231.5; 403/391
[58] Field of Search ............... 280/79.11, 79.3, 47.34, 280/47.35; 24/20 R, 270, 273; 108/901; 211/182, 189; 248/68.1, 188, 229, 231.5, 316.5; 403/391, 396

[56] References Cited

U.S. PATENT DOCUMENTS

| 379,221 | 3/1888 | Hering | 403/391 X |
|---|---|---|---|
| 1,968,273 | 7/1934 | Wegner | 280/79.3 X |
| 2,774,609 | 12/1956 | Winger | 280/79.11 |
| 2,969,245 | 1/1961 | Wilson | 280/79.11 X |
| 3,125,353 | 3/1964 | Gohmann | 280/47.34 X |
| 3,338,608 | 8/1967 | Burns et al. | 403/391 |
| 4,427,379 | 1/1984 | Duran et al. | 280/79.3 X |
| 5,002,244 | 3/1991 | Holbury et al. | 248/68.1 |

FOREIGN PATENT DOCUMENTS

| 51603 | 1/1912 | Austria | 24/270 |
|---|---|---|---|
| 2596718 | 10/1987 | France | 280/79.11 |
| 3-12608 | 3/1991 | Japan . | |
| 3-200471 | 9/1991 | Japan | 280/79.3 |
| 252048 | 9/1948 | Switzerland | 248/229 |
| 515355 | 12/1939 | United Kingdom | 24/270 |

Primary Examiner—Brian Johnson
Attorney, Agent, or Firm—Dellett and Walters

[57] ABSTRACT

A corner joint of a chassis of a cart which, positioned at each of the four corners of said chassis, connects frames on two sides that constitutes the chassis at a right angle. The corner joint comprises cylindrical parts formed with insert openings wherein the frame members are inserted for connection, a cylindrical part having a vertical through hole at the outer corner where said two cylindrical parts meet, and a caster attachment part which, provided in the plane defined and enclosed by said cylindrical parts that join each other at a right angle, connects the cylindrical parts at the mid-height thereof and which has the same configuration on the top and the bottom surfaces thereof.

8 Claims, 5 Drawing Sheets

CORNER JOINT, CHASSIS AND CART

BACKGROUND OF THE INVENTION

This invention relates to corner joint used at the four corners of a chassis of a handcart, a shelf-frame cart, a box cart or a flat cart, to a chassis assembled using said corner joint, and to a cart assembled using said chassis.

Known corner joints and chassis assembled using them, such as those described in Japanese Published Patent Application No. 12608/1991, are formed as products of injection molding from synthetic resin or from worked metal, and are rectangular in shape seen in a plan view. Along the rectangular outer periphery, two rising parts of inverted U shape are provided and insertion grooves are formed therein to receive flanges or angled webs that serve as longitudinal or transverse frames of a chassis. A number of attachment holes are provided in the longitudinal direction along the rising parts, and rectangular bolt holes are used for attaching universal wheels and fixed wheels to a support plate that connects the rising parts. A chassis that can be modified in plan shape and size is easily constructed by attaching universal wheels or fixed wheels to said support plate, inserting the flanges or angled webs, having a number of spaced attachment holes formed in the longitudinal direction, into said two grooves for forming a right angle therebetween, and by inserting bolts into selected attachment holes of the angled webs through the attachment holes of the rising parts which are aligned thereto. A cart is completed by mounting an upper structure thereon, such as a framework or a handle set for hand pushing.

The known corner joint described above, however, is constructed by using angled webs for frame members, and therefore cannot be employed well under erosive conditions, for example, in the presence of seawater and agricultural chemicals, because the angled webs are made of steel, are heavy and are easily rusted. Further the known chassis are not practical in that they do not have the means to mount an upper structure of a cart thereto and are especially lacking in a means to facilitate repair, modification, and replacement of the upper structure of the cart.

SUMMARY OF THE INVENTION

A corner joint according to the invention consists of two cylindrical parts perpendicular to each other, formed with openings for bayonet connecting frame members of two sides of a chassis, a vertical cylindrical part formed with a vertical through hole at the outer corner where said two cylindrical parts meet at a right angle, and a caster attachment part which connects said two perpendicular cylindrical parts in the plane defined and enclosed by said two cylindrical parts at just the mid-height thereof and which is formed to have the same configuration on the top and the bottom surfaces. This corner joint has a symmetrical configuration with respect to the top and the bottom sides, which permits it to be used on both right and left portions of a chassis by turning it 180 degrees upside down.

The chassis has said corner joint at the four corners thereof, and frame members of the four sides of the chassis are connected by said corner joint to form a rectangle in the horizontal plane. The corner joint and the frame members can be disconnected easily. In the vertical through holes of the corner joint, which are formed at the outer corners thereof, the lower ends of stays of a framework, or a handle set for hand pushing, which constitute the upper structure of a cart, are inserted. Clamp means are provided on the frame members of the chassis to fix said framework or handle set to the chassis, and fastening these clamp means completes the cart. By unfastening the clamps, the chassis and the upper structure can be separated for repair, modification and replacement. A caster is attached under each of the corner joints.

Two parallel frames are provided on each of the longer sides of the chassis, one inside and the other outside when seen in plan view. The portion of each of the corner joints opposing the longer sides of the chassis consists of two cylindrical parts, each having an insert opening for the corresponding frame member. The frame members are connected to the joints by being inserted into the corresponding openings of the cylindrical parts.

The frame members of the chassis are a double-pipe, constructed of two parallel pipes firmly fixed together by means of connection plates. Each of the cylindrical parts of the corner joint is, as seen from the front, formed with a B-shaped insert opening to receive this frame member. Bolt holes are provided through the side surfaces of the cylindrical parts of the corner joint, for securing the double-pipes, while holes that are to be aligned with said bolt holes are formed in the connection plates of the double-pipes. On the sides of the connection plates opposite said bolt holes, sleeve nut portions of plate type nuts are provided. The bolts insert into said bolt holes, and are fixed thereto by screwing into said sleeve nut portions of the double-pipes. Disconnection of the double-pipes from the corner joint is accomplished by unfastening and removing the bolts.

The caster attachment part of the corner joint is provided with a plurality of vertical through holes for receiving bolts and with stiffening ribs, in such a manner that the top and the bottom sides have the same configuration. The caster is attached to the corner joint by fitting the attachment plate of the caster to the bottom surface of the caster attachment portion of the corner joint, by aligning the screw holes of the attachment plate with the bolt holes of the corner joint caster attachment portion, and by fastening bolts inserted from above into the attachment plate screw holes.

The fastening means consists of a wrapping member that is attached around the double-pipe, an embracing piece that is pivotally connected to the upper end of one side of said wrapping member via a hinge and that has a form to enable embracing of the upper structure of the chassis. The fastening means further consists of a ring-shaped latch that is connected at one end to a toggle lever which is rotatably attached to the other end of the winding member, and is engaged at the other end with a hook piece on the embracing member which embraces the upper structure of the chassis. The upper structure may comprise a framework or a handle set for hand pushing, for example.

The cart is assembled by inserting the lower ends of the stays of a framework or handle set into the four vertical through holes provided at the outer corners of the four corner joints and securing the fastening means.

The corner joint, which is symmetrical with respect to the top and bottom surfaces, can be used on both sides of the chassis via reversing (turning 180 degrees) for use on the left side, if it is said to be in the normal mode when used on the right side.

The connection of the frame members and a corner joint is effected by inserting the ends of the frame members into the openings of the cylindrical parts of the corner joint and by inserting bolts through the bolt holes provided in the side of the cylindrical parts, and fastening the bolts into the sleeve nut portions of the plate type nuts provided on the frame members. Disconnection can be effected by unfastening and removing the bolts. Thus, it is always possible to replace the frame members and/or the corner joints. It is also possible to change the shape of the chassis to an elongated shape or a square shape by changing the length of the frame members. It is also possible to change the size of the chassis by changing the length of both the longer and shorter sides. The upper structure of the cart mounted on the chassis, such as a framework or a handle set for pushing, is fixed by fastening clamp means. Therefore, by unfastening and removing the clamp means, the upper structure can be separated from the chassis for repair or modification. The cart produced by employing said chassis can be employed well in erosive conditions, for example, in the presence of seawater and agricultural chemicals, because the surfaces of the frame members are covered with synthetic resin for resisting corrosion (anticorrosive).

The primary object of the invention is to provide a corner joint that can be used not only in a normal mode but also in a reversed mode (by turning 180 degrees) and can be employed at both the left and right sides of a chassis.

Another object of the invention is to provide a chassis that is assembled with said corner joint and that can be dismantled easily. The chassis is especially assembled with double-pipe frame members which are light and strong. The surfaces of the double-pipe frame members are covered with synthetic resin for resisting corrosion (anticorrosive), and therefore, the chassis can be used under erosive conditions, for example, in the presence of seawater and agricultural chemicals.

A further object of the invention is to provide a cart that uses said chassis, allowing great freedom both in selection and modification of the construction and type of the cart's upper structure, including, for example, shelf framework, handle sets for pushing and steering containers, etc.

Another object of the invention is to provide a chassis of cart that can be assembled and dismantled easily, and is suited for repair and reconstruction, having a means to mount the upper structure of a cart on the chassis, especially providing a means that is highly convenient for repair, reconstruction and replacement, and to provide a cart made using said chassis that is very high in practical utility.

DETAILED DESCRIPTION

Figure 1:
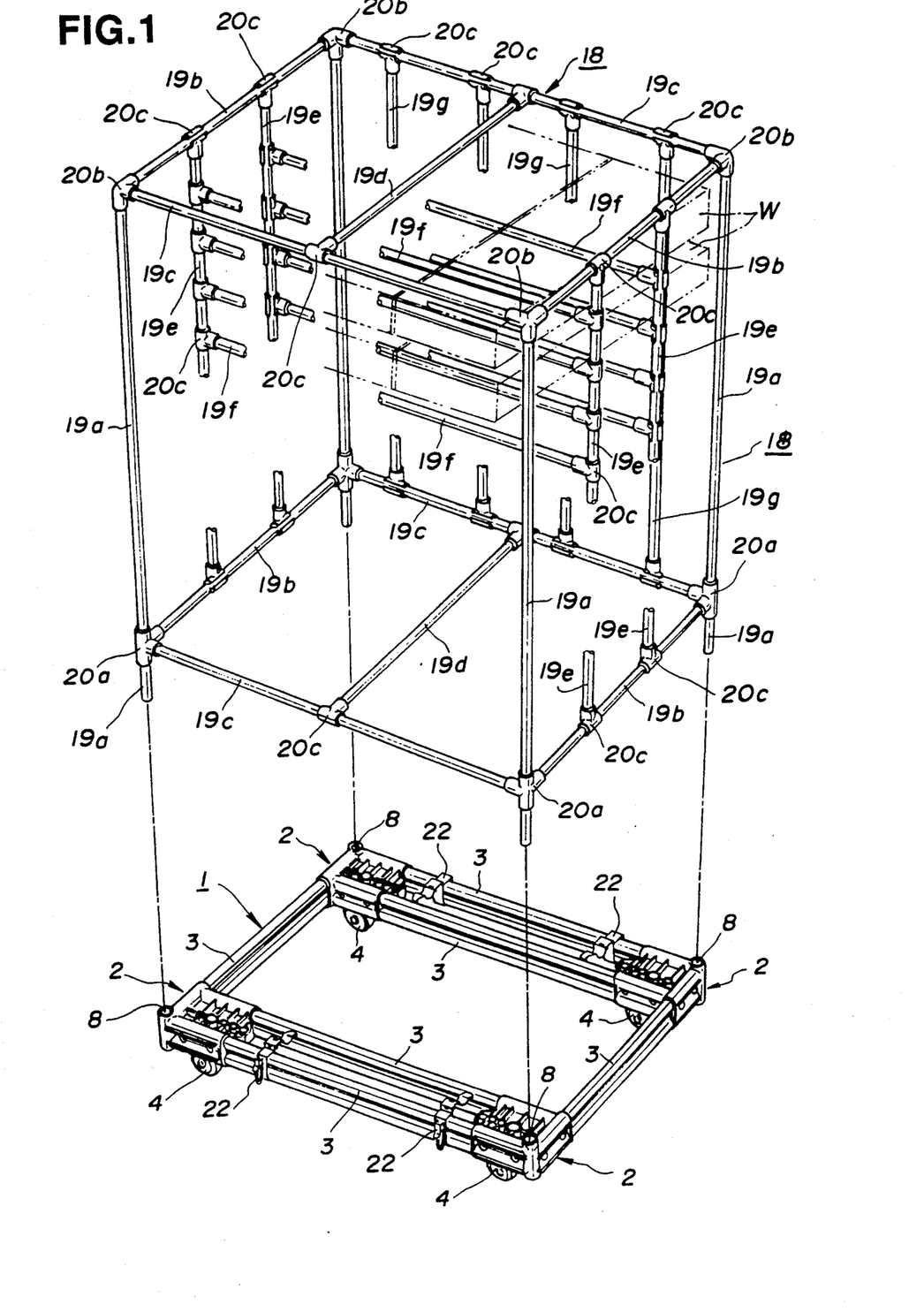
FIG. 1 is a perspective view showing a shelf cart consisting of a chassis assembled using the corner joint according to the invention and a shelf framework, in dismantled condition.

The shelf cart shown in FIG. 1 is assembled by inserting the lower ends of the four stays 19a of the shelf framework 18 into the vertical holes 8 which are provided in the four corner joints 2 of the chassis 1. The corner joint 2 is used at each of the four corners of the chassis. Whether the chassis is viewed from in front of the longer side or from in front of the shorter side, the corner joints on the right and on the left are the mirror images of each other (one is produced by turning the other upside down). The chassis 1 is assembled with two frame members 3,3 on the longer sides and one frame member 3 on the shorter sides, each frame member being connected to a corner joint. A caster 4 is attached under each of the corner joints.

Figure 2:
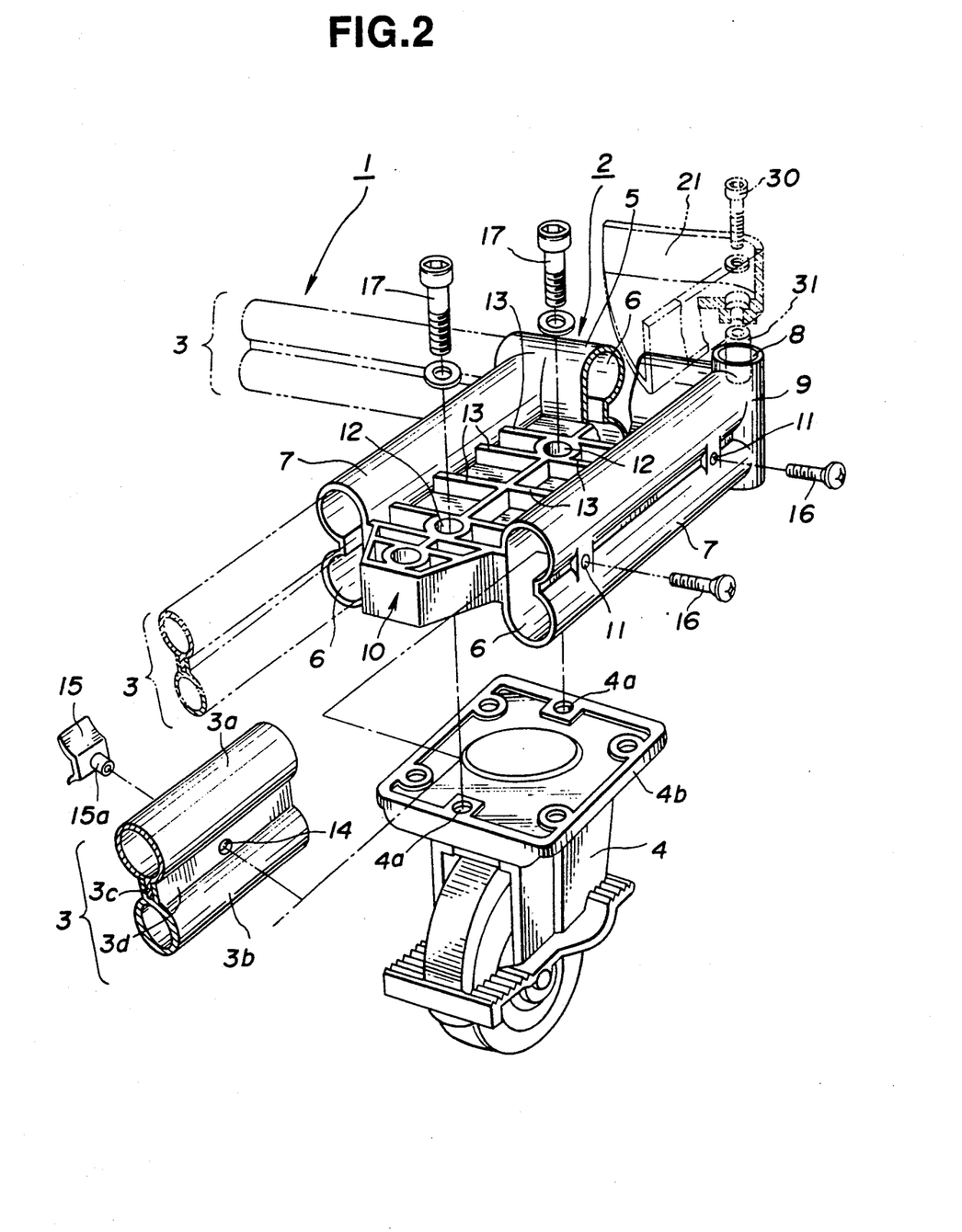
FIG. 2 is a perspective view showing a corner joint according to the invention being applied to a chassis.

The corner joint 2 is produced by injection molding of an engineering plastic such as polyethylene terephthalate (PET). The frame member 3 is, as shown in FIG. 2, a double-pipe consisting of two parallel pipes 3a and 3b, one under the other, fixed together firmly by means of convex and concave connection plates 3c and 3d, which protrude radially and extend axially the length of the pipes. The corner joint 2 is an integral structure including a shorter side and a longer side. The longer side comprises two parallel cylindrical parts 7 having insert openings 6 which are roughly B-shaped seen from the front thereof, for connecting to the double-pipes. A cylindrical part on the shorter side joins the cylindrical parts for the longer sides at a right angle. It will be appreciated that the load capacity of the chassis is greatly increased by employing two parallel double-pipes 3,3 connected to the insert openings 6,6 of the two cylindrical parts 7,7 in the longer side. A double-pipe 3 is connected to the insert opening 6 of the single cylindrical part 5 for the shorter side. A cylindrical part 9 having a vertical through hole 8 is provided at the cross point where the cylindrical part 5 of the shorter side and the cylindrical parts 7 of the longer side meet at a right angle. Stays 19a, positioned at the four corners of the shelf framework 18, are inserted into the through holes 8. In the plane defined and enclosed by the right angle forming cylindrical parts 7,7 and cylindrical part 5, a caster attachment part 10 is provided consisting of a thick plate that has the same configuration on the top and bottom surfaces. The caster attachment part 10 is provided with a plurality of vertical through holes 12,12 for receiving bolts 17, and stiffening ribs 13 on both the top and bottom surfaces. The holes and ribs are arranged in such a manner that the top and the bottom sides have the same configuration. Thus the caster attachment part 10 has the same configuration on both the top and the bottom sides and since it is attached right at the mid-height of the cylindrical parts 5 and 7, the top and bottom sides of the corner joint 2 are symmetrical. Hence the same corner joint 2 can be used for all of the corners of the chassis 1 in either a normal mode or in a reversed (turned 180 degrees) mode. Bolt holes 11 are provided in the middle of the sides of the cylindrical parts 5 and 7 for receiving bolts to fix the double-pipes 3 within the insert openings 6.

Figure 5:
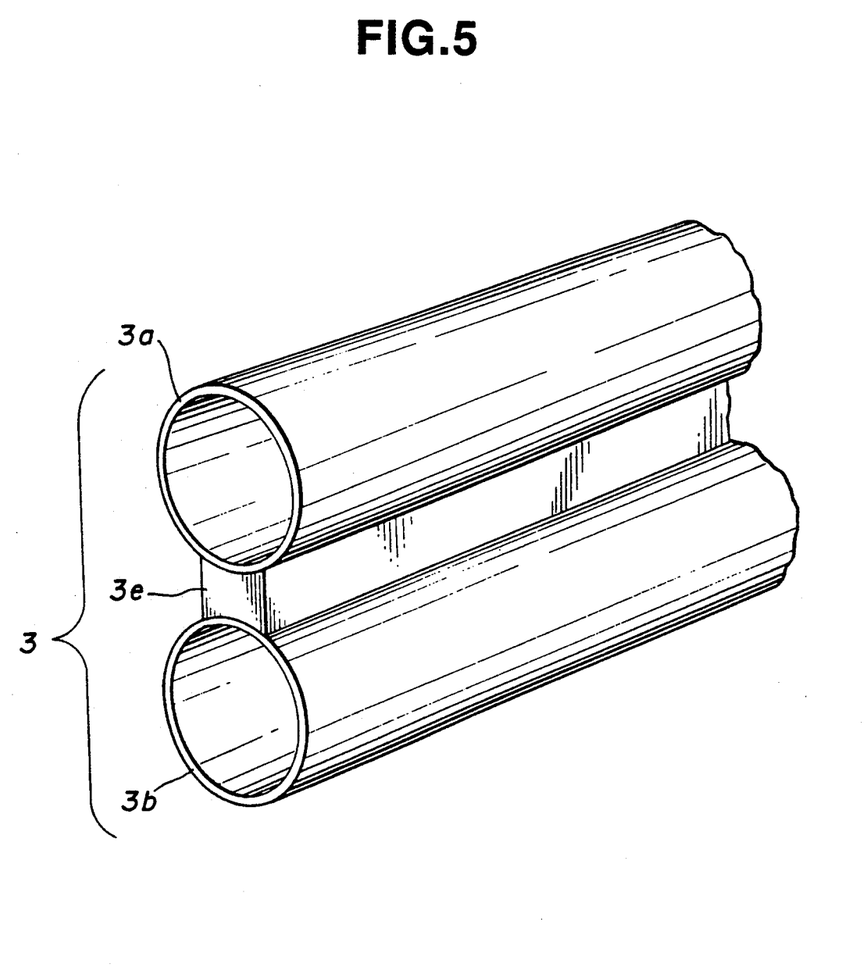
FIG. 5 is a perspective view showing an alternative double-pipe.

The pipes 3a,3b that constitute the double-pipes consist of thin steel pipes coated with a synthetic resin, such as acrylate styrene acrylonitrile (AAS), so as to be 28–32 mm in outer diameter. Therefore, the pipes 3a,3b are light, strong and have excellent anticorrosive properties. In addition to the outer surface of pipes 3a and 3b, the convex or concave connecting plates 3c and 3d that protrude radially from the pipes and extend continuously in the axial direction are also made from said coating resin. The double-pipe 3 is constructed from the pipes 3a and 3b by fitting and gluing the connecting plates 3c and 3d. At a position near the end of the double-pipe 3 where the center of the bolt hole 11 comes when the double-pipe is inserted, holes 14 penetrate both of the connecting plates 3c and 3d and a sleeve nut portion 15a of a plate nut 15 is set there. The plate nut 15 is tightly adhered to the double-pipe and is thereby prevented from slip rotation. Thus the end of the double-pipe 3 having the plate nut 15 at the hole 14 is inserted into the insert opening 6 of either the cylindrical part 5 or the cylindrical part 7. The centers of the bolt holes 11 of the cylindrical part 5 or 7 and the hole 14 of the double-pipe 3 are aligned and firm connection is effected by fastening bolt 16 through the bolt hole 11 into the sleeve nut portion 15a of the plate nut 15. Of course, it is possible to disconnect the corner joint 2 and the double-pipes 3 by unfastening and removing the bolts 16, and thereby to disassemble the chassis 1. Thus it is possible to repair or replace a corner joint 2 or double-pipe 3 when one is broken and also to change the shape or the size of the chassis 1. The double-pipe 3 can also be made by fastening connection plate 3e to pipes 3a and 3b by means of a solvent or a bonding agent as shown in FIG. 5, or by fastening with connectors to said pipes 3a, 3b.

The caster 4, regardless of whether it is a universal wheel or a fixed wheel, is also made as a product of injection molding from an engineering plastic similar to one used for the corner joint 2.

Generally, it is understood that the front and rear wheels of the chassis 1 are a combination of universal wheels and fixed wheels. Each of these casters is attached to the caster attachment part 10 of the corner joint 2 by fitting the attachment plate 4b at the top thereof to the lower surface of the caster attachment part 10, then aligning the screw holes 4a and the bolt holes 12. Then bolts 17 are inserted from above and fastened into the screw holes 4a of the attachment plates 4b. It is understood that the caster 4 can be easily removed for repair or replacement when one is broken by unfastening the bolts 17.

In FIG. 2, the bolt holes 12 of the caster attachment part 10 of the corner joint 2 are shown to be uniform, straight holes, having the same diameter everywhere. However, these holes 12 can be provided with a recess at each end thereof, having a diameter and depth sufficient for the head of the bolt to be accommodated therein to solve the problem that when a plurality of the chassis 1 are stacked, they become unstable because the casters 4 sit on the heads of the bolts.

As described above, if any one of the corner joints 2, the double-pipes 3, or the casters 4, is damaged or broken, it is easy to repair it or replace it with a new one by disconnecting it. Further, it is also easy to change the size of the chassis (lengths of the longer and the shorter sides) or the planar shape of the chassis by preparing double-pipes of desired length and replacing the old ones with them.

The construction and configuration of the shelf frameworks 18 that constitute the upper structures of a cart are very diverse and will not be enumerated. The shelf framework 18 in FIG. 1 is constructed from stays 19a, shorter horizontal frames 19b, longer horizontal frames 19c, and intermediate frames 19d, that are of the same 28-32 nm diameter resin-coated steel pipe as the pipes 3a and 3b used for the double-pipes 3. The shelf framework also employs various joints 20a, 20b, 20c made by injection molding from the above mentioned synthetic resin. The joints connect the frames and stays into 3-dimensional rectangles that are substantially of the same shape as the chassis 1 when seen in a plan view. The shelf framework 18 is provided with vertical pipes 19e connected between two vertically adjacent frames 19b, 19b by joint 20c, and has a number of horizontal shelf pipes 19f connected between said vertical pipes 19e, 19e that are opposing each other in the direction of the horizontal sides, to form shelves that are a little greater in height than the articles W. To prevent the articles W from falling off the shelves in the direction of the shorter sides (the depth direction), a plurality of stopper frames 19g are connected by joints 20c at a relatively small pitch between the two vertically adjacent horizontal frames 19c, 19c at the far end of the shelves. The article W is placed on the shelf by being put between the pipes 19e from the side toward the viewer in FIG. 1. The lower end of the stays 19a at the four corners of the shelf framework 18 are inserted into the vertical through holes 8 of the corner joints 2 situated at the outer corner of the chassis. The horizontal frames 19c of the shelf framework are fastened firmly to the chassis 1 by the clamp means 22 provided on the top of the double-pipes. The shelf framework 18 can therefore be dismantled from the chassis 1 by unfastening and disengaging the clamp means 22, for replacement with another framework.

Figure 3:
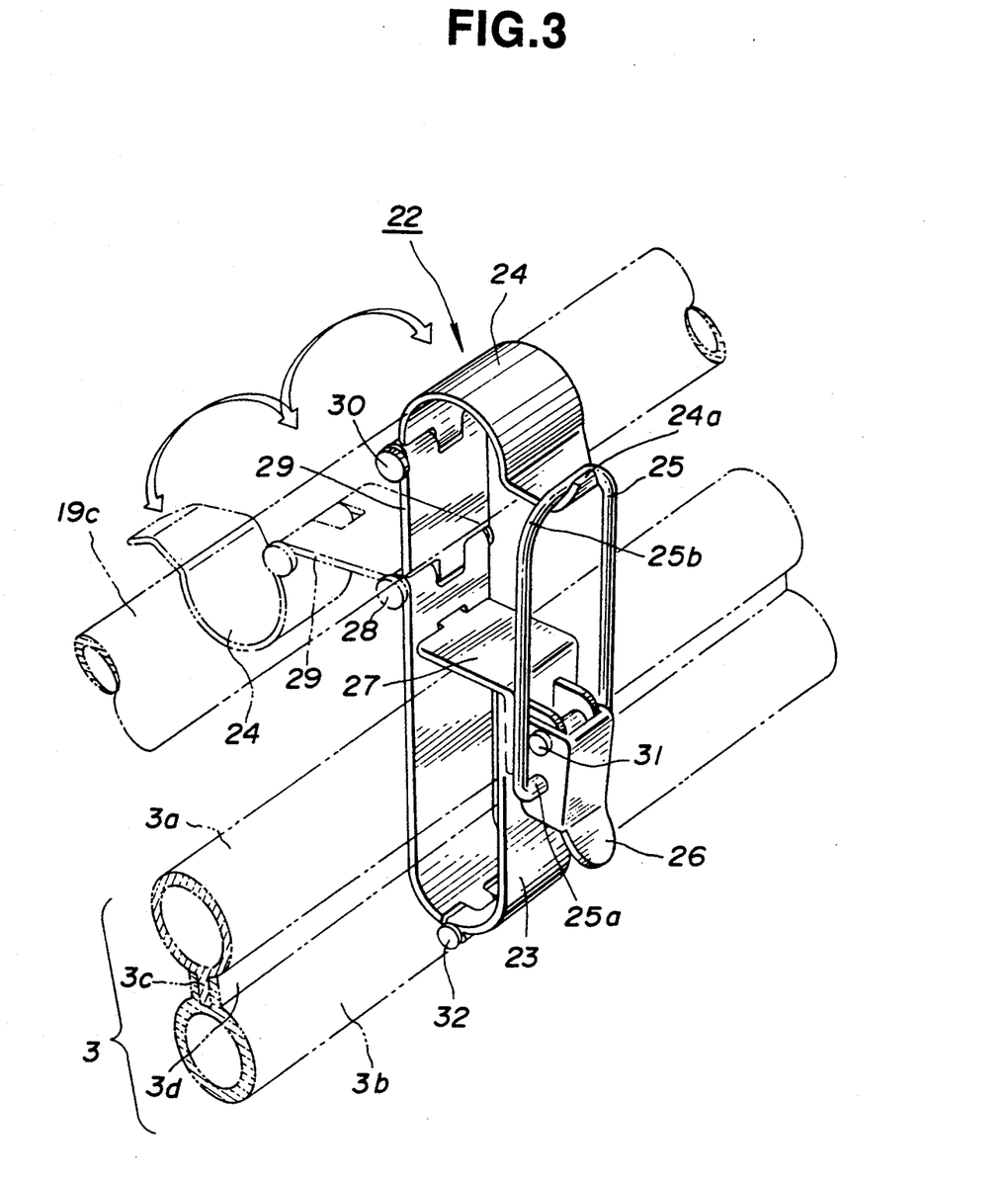
FIG. 3 is a perspective view showing a clamp means in use.

As shown in detail in FIG. 3, the clamp means 22 comprises a U-shaped wrapping member 23 which embraces the outer periphery of the double-pipe 3, is coupled pivotally at a hinge 32, and which has one constituent piece (the one in the front seen in FIG. 3) bent inwardly at a right angle to form a stopper 27. A short piece 29 is pivotally connected to the other constituent piece by means of a hinge 28 and a reversed-U-shaped embracing piece 24, which is connected to said short piece 29 with a hinge 30, is adapted to be thrown over the upper half of the horizontal frame 19c. A toggle bar 26 is rotatably attached by means of a hinge pin 31 to the front of the piece having the stopper 27 of the wrapping member 23. A ring-shaped latch 25 is connected to the toggle bar 26 at one end 25a and engages with a hook piece 24a of the embracing piece 24 at the other end 25b. FIG. 3 shows in solid lines the clamp means fastening a shelf framework. As shown in phantom in FIG. 3, the shelf framework 18 can be dismantled from the chassis 1 by first flipping the toggle lever 26 180 degrees upward, disengaging the latch 25 from the hook piece 24a, and then disengaging the embracing piece 24 from the horizontal frame 19c.

Figure 4:
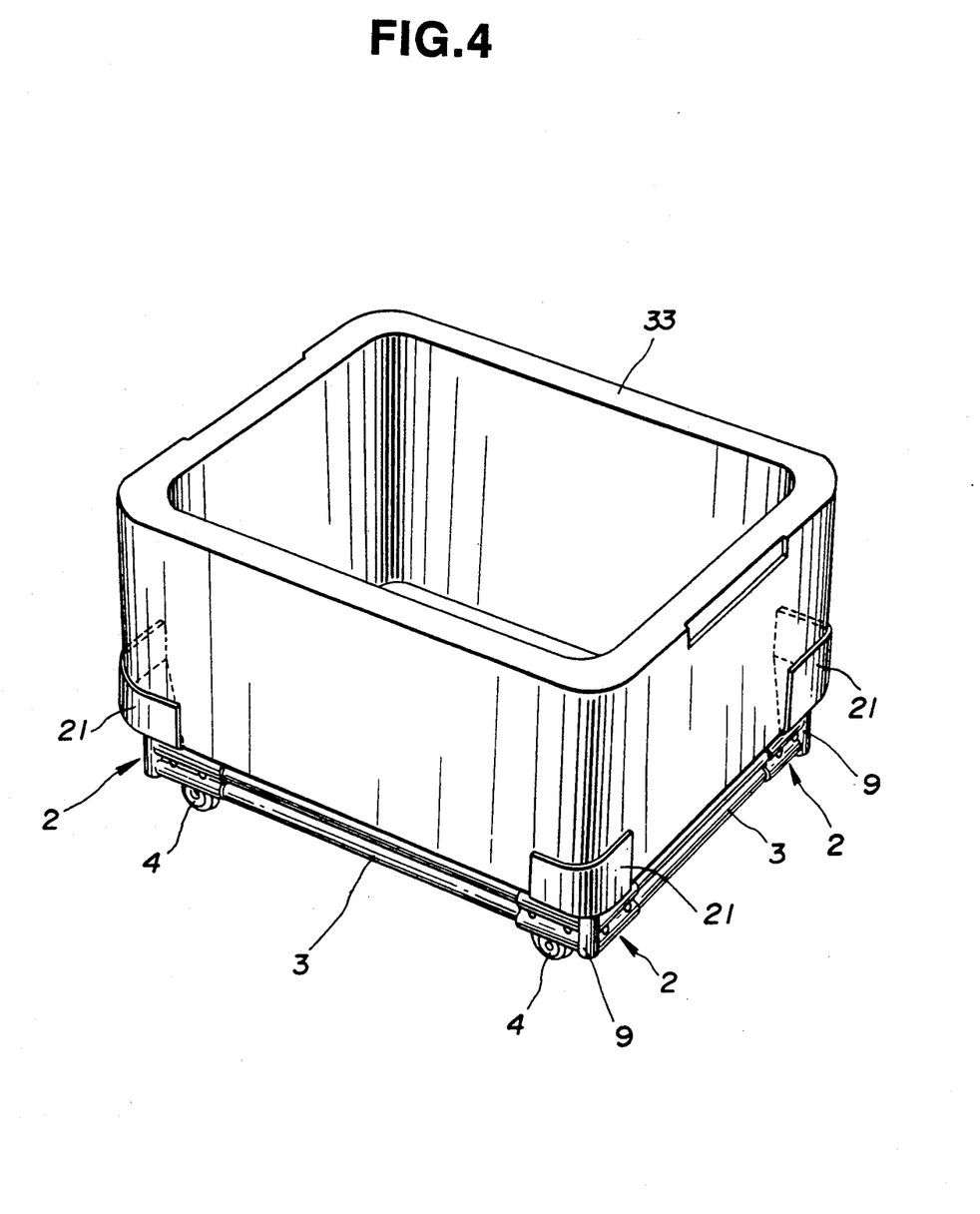
FIG. 4 is a perspective view of a flat cart.

The above described shelf framework 18 is not the only one that can be mounted on the chassis 1 as an upper structure. According to the type of cart, upper structures such as a box framework or a handle framework may be used to assemble a cart with a framework. Further, a flat cart can be constructed by attaching corner pieces 21, shown in FIG. 2 in phantom, on the top of the corner joint 2 at the four corners of the chassis 1, and putting a container 33 directly thereon as shown in FIG. 4. Each of the corner pieces 21 is fixed to the corner joint 2 by inserting a bolt 30 with an elastic sleeve nut 31 into the through hole 8. By further screwing the bolt into the elastic sleeve nut, the diameter of the sleeve nut increases, thereby generating friction between the inner surface of through hole 8 and sleeve nut 31.

The corner joint 2 may be made either by injection molding an engineering plastic, as mentioned above, or from frame AAS resin or the like, providing the advantage in use that connection by gluing becomes possible because the material is the same as the coating of the double-pipes 3 and the stays 19a.

What is claimed is:

1. A corner joint for a cart chassis for connecting two double-pipe frame members of the chassis at a right angle, each double-pipe frame member comprising two pipes interconnected to one another, comprising:
   two first parts with first and second ends, having insert openings in the first ends thereof and adapted to receive the frame members respectively within the insert openings via sliding insertion, each insert opening of each of said first parts being substantially B-shaped in cross section;
   a third part defining an outer corner of the corner joint, wherein the second ends of said two first cylindrical parts attach to said third part such that said two first parts define a right angle; and
   a caster attachment part having the same configuration on top and bottom surfaces thereof, positioned in an interior angle defined and enclosed by said two first parts.

2. A corner joint according to claim 1, where said first parts have bolt holes in sides thereof, adapted to align with holes in said frame members when said frame members are inserted into the insert openings and to receive bolts therein for fixing the frame members against sliding removal from the insert openings.

3. In combination, a corner joint according to claim 1 and first and second frame members with first and second ends, wherein the first end of said first frame member is received in the insert opening of one of said first parts and the first end of said second frame member is received in the insert opening of the other of said first parts.

4. The combination according to claim 3, wherein each of said first and second frame members comprises:
   two parallel pipes; and
   a connection plate, wherein said two parallel pipes are fixed together by said connection plate.

5. The combination according to claim 3, further comprising sleeve nut portions of plate type nuts positioned at one side of a hole in each of said frame members, wherein said frame members are adapted to be fixed firmly to said corner joint with screws into said sleeve nut portions.

6. A cart comprising an upper structure and a wheeled lower structure, said wheeled lower structure comprising:
   a double-pipe frame member; and
   clamp means, wherein said clamp means comprises, a wrapping member for attaching around said double-pipe frame member,
   an embracing piece having a hook piece and connected pivotally to a first side of said wrapping member and adapted to embrace a portion of the upper structure of the cart,
   a toggle lever attached rotatably to a second side of said wrapping member, and
   a ring-like latch connected at a first end thereof to said toggle lever and adapted to engage at a second end thereof with the hook piece of said embracing piece to clamp said upper and lower structure of said cart together.

7. A chassis for a cart, wherein the cart has an upper structure with downwardly extending posts, comprising:
   first, second, third and fourth corner joints defining respective corners of the chassis and comprising first cylindrical parts having insert openings that are substantially B-shaped in cross section and having bolt holes through a side thereof, each corner joint having a vertical through hole at an outer corner thereof for receiving via insertion the lower end of a post of the upper structure of said cart;
   four casters, one caster attached to the lower surface of each corner joint;
   four frame members defining respective sides of said chassis, each of said frame members comprising double-pipes consisting of two parallel pipes, one below the other, and connecting plates, wherein the two parallel pipes are integrally connected by means of the connecting plates, a first frame member being removably connected at two opposite ends to said first and second corner joints respectively, a second frame member being removably connected at two opposite ends to said second and third corner joints respectively, a third frame member being removably connected at two opposite ends to said third and fourth corner joints respectively and a fourth frame member being removably connected at two opposite ends to said fourth and first corner joints respectively to form a horizontal rectangle, wherein each end of each of said frame members has holes on the sides thereof adapted to be aligned with said bolt holes in said cylindrical parts, wherein at least one of said frame members has a clamp means to fix the upper structure to said chassis; and
   a plurality of sleeve nut portions of plate type nuts positioned at the ends of said holes in said double-pipes, opposite said bolt holes,
   wherein said double-pipes are adapted to be inserted into said insert openings of said corner joints and to be fixed firmly with screws into said sleeve nut portions.

8. A chassis of a cart, said cart having an upper structure with downwardly extending posts, comprising:
   first, second, third and fourth corner joints defining respective corners of the chassis, each joint comprising two side-by-side first cylindrical parts having insert openings that are substantially B-shaped in cross section and having bolt holes through a side thereof, and a second cylindrical part having an insert opening that is substantially B-shaped in cross section and having bolt holes through a side thereof, each corner joint having a vertical through hole at an outer corner thereof for receiving via insertion the lower end of a post of the upper structure of said cart;
   four casters, one caster attached to the lower surface of each corner joint;
   first, second, third and fourth frame members defining respective sides of said chassis, said first and third frame members comprising two side-by-side parallel members, each of said parallel members comprising double-pipes consisting of two parallel pipes, one below the other, and connecting plates, wherein the two parallel pipes are integrally connected by means of the connecting plates, said second and fourth frame members comprising double-pipes consisting of two parallel pipes, one below the other, and connecting plates, wherein the two parallel pipes are integrally connected by means of the connecting plates, said first frame member being removably connected at two opposite ends to said first and second corner joints respectively, said second frame member being removably connected at two opposite ends to said second and third corner joints respectively, said third frame member being removably connected at two opposite ends to said third and fourth corner joints respectively and said fourth frame member being removably connected at two opposite ends to said fourth and first corner joints respectively to form a horizontal rectangle, wherein each end of each of said frame members has holes on the sides thereof adapted to be aligned with said bolt holes in said cylindrical parts, wherein at least one of said frame members has a clamp means to fix said cart to said chassis; and a plurality of sleeve nut portions of plate type nuts positioned at the ends of said holes in said double-pipes, opposite said bolt holes, and wherein said double-pipes are adapted to be inserted into said insert openings of said corner joints and to be fixed firmly with screws into said sleeve nut portions.

* * * * *